United States Patent [19]
Pehl

[11] Patent Number: 5,291,344
[45] Date of Patent: Mar. 1, 1994

[54] MAGNETIC TAPE RECORDING DEVICE HAVING A RECTIFIER INSTALLED ON A ROTATING HEAD DRUM FOR RECTIFYING A SIGNAL BEING APPLIED TO THE HEAD

[75] Inventor: Hermann-Josef Pehl, Darmstadt, Fed. Rep. of Germany

[73] Assignee: U.S. Philips Corporation, New York, N.Y.

[21] Appl. No.: 945,775

[22] Filed: Sep. 16, 1992

[30] Foreign Application Priority Data

Sep. 26, 1991 [DE] Fed. Rep. of Germany ....... 4132004

[51] Int. Cl.⁵ ............................................. G11B 5/09
[52] U.S. Cl. ...................................... 360/39; 360/46; 360/64
[58] Field of Search .............. 360/39, 46, 40, 64, 360/66, 67, 68; 375/17, 18

[56] References Cited

U.S. PATENT DOCUMENTS

| | | | |
|---|---|---|---|
| 4,271,439 | 6/1981 | Wray | 360/65 |
| 4,367,495 | 1/1983 | Mita et al. | 360/39 |
| 4,455,584 | 6/1984 | Heitmann | 360/108 |
| 4,528,601 | 7/1985 | Moriyama et al. | 360/46 |
| 4,561,027 | 12/1985 | Sita et al. | 360/39 |
| 5,130,862 | 7/1992 | Kobayashi et al. | 360/40 |

OTHER PUBLICATIONS

N. Q. Duc et al, "Line Coding For Digital Data Transmission", A. T. R. Publication, vol. 11, No. 2, 1977, pp. 14–27.

Primary Examiner—Donald Hajec
Assistant Examiner—Jhihan Clark
Attorney, Agent, or Firm—Edward W. Goodman

[57] ABSTRACT

In an arrangement for inductive transmission of a data signal to the recording head (9) in a magnetic tape recording device, in which the data signal to be transmitted to the recording head is delayed by a bit period, the undelayed signal and the delayed signal are combined and applied to an inductive transmission arrangement (11, 13). After passage through the inductive transmission arrangement, the combined signal is rectified in a rectifier (21) and then subjected to a DC voltage shift (22). The resultant signal is then amplified (10) and applied to the recording head.

8 Claims, 3 Drawing Sheets

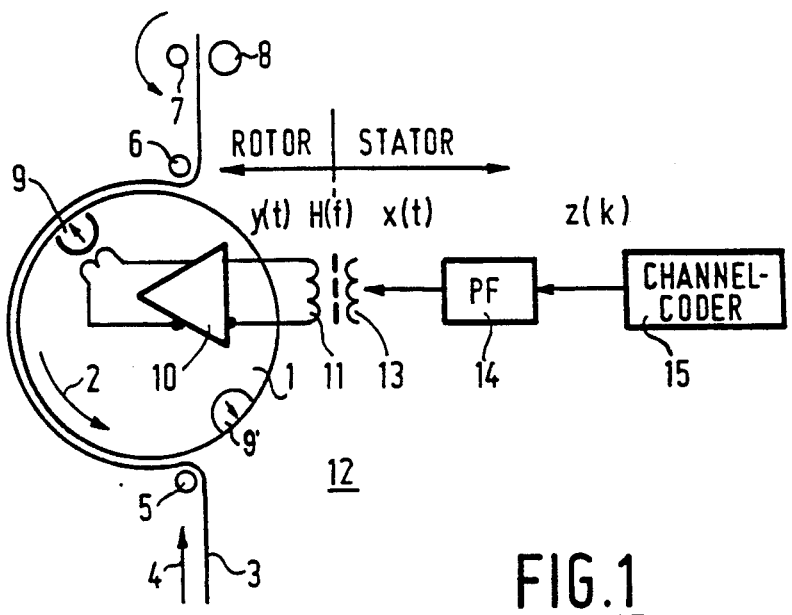
FIG. 1
PRIOR ART
FIG. 2a
PRIOR ART
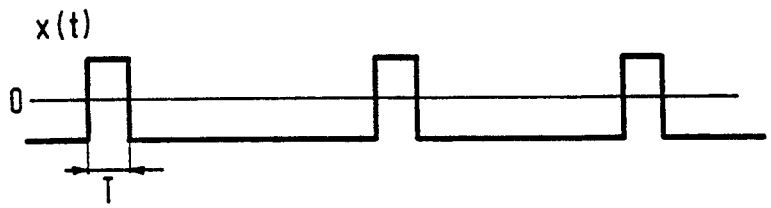
FIG. 2b
PRIOR ART
FIG. 2c
PRIOR ART
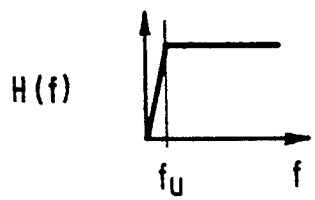
FIG. 2d
PRIOR ART
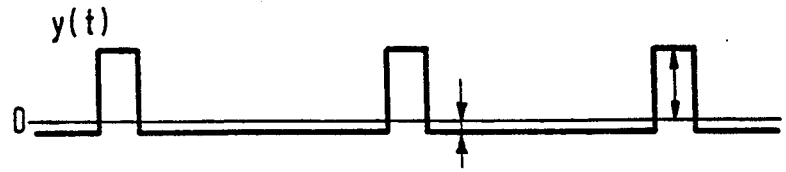

FIG. 4a  z(k)  0 1 0 0 0 0 0 1 0 0 0 0 0 1 0
FIG. 4b  z'(k)  0 1 1 1 1 1 1 0 0 0 0 0 0 1 1
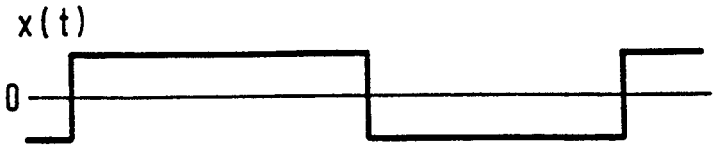
FIG. 4c  x(t)
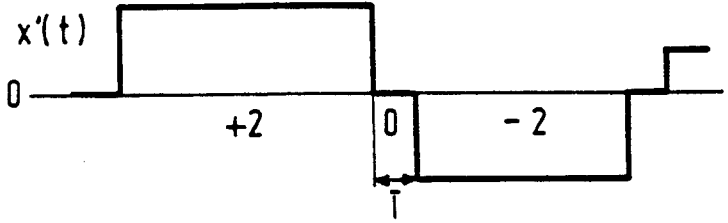
FIG. 4d  x'(t)    +2    0    −2    T
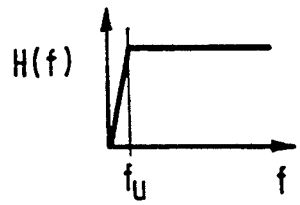
FIG. 4e  H(f), $f_u$, f
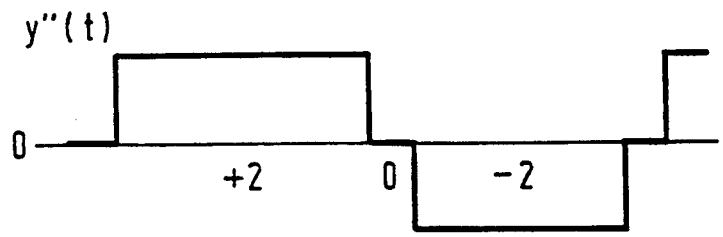
FIG. 4f  y''(t)   +2   0   −2
FIG. 4g  y'(t)
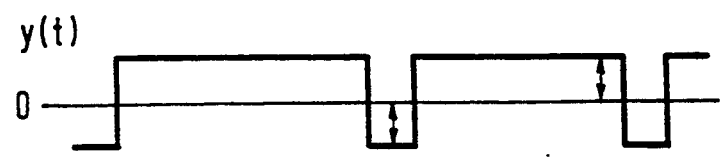
FIG. 4h  y(t)

MAGNETIC TAPE RECORDING DEVICE HAVING A RECTIFIER INSTALLED ON A ROTATING HEAD DRUM FOR RECTIFYING A SIGNAL BEING APPLIED TO THE HEAD

BACKGROUND OF THE INVENTION

1. Field of the Invention

The invention is based on a magnetic tape recording device for recording digital data signals in tracks to be recorded obliquely relative to the longitudinal direction of the magnetic tape, comprising a rotary drum on which at least two recording heads are installed, an inductive transmission arrangement for transmitting to the magnetic heads the data signal to be recorded, which transmission arrangement comprises a stator winding and a rotor winding, an input terminal for receiving the data signal to be recorded, a coding arrangement coupled with an input to the input terminal and coupled with an output to the stator winding, which coding arrangement comprises a delay arrangement for delaying the data signal to be recorded for the duration of a bit period in the data signal, and includes a signal combining stage, which signal combining stage is arranged for combining the data signal delayed by a bit period and the undelayed data signal obtain a ternary output signal.

The frequency spectrum of a square-wave data signal comprises spectral portions stretching out to infinity. Undistorted transmission of such a data signal requires a transmission channel that has an infinite bandwidth. A transmission channel having inductive coupling does not have such a bandwidth, however. For example, the transmission channel of a rotary scanning device for video magnetic tape recorders has only a band-pass character in which a top and a bottom cut-off frequency in essence depend on the transmission ratio of a rotary transformer.

DESCRIPTION OF THE RELATED ART

DE 30 45 544 A1 (corresponding to U.S. Pat. No. 4,455,584) discloses an apparatus for recording digital signals on a magnetic tape, which comprises a tape guiding stator, a rotor comprising at least one recording magnetic head and arranged movably relative to the stator, and switching means for contact-free transmission of the digital signals from the stator to the rotor. On the side of the rotor, between the recording magnetic head and the switching means, a circuit arrangement e.g. a clamping circuit, is arranged for recovering the DC voltage component lost as a result of the inductive coupling. Furthermore, there is arranged, on the side of the rotor, a current switch comprising a first and a second current source, which switch follows the clamping circuit and drives a recording magnetic head.

Furthermore, U.S. Pat. No. 4,561,027 discloses a system for a magnetic recording device in which the edge information of a data signal as well as a clock signal assigned to the data signal are transmitted through two rotary transformers. On the side of the rotor of the rotary transformers, the data signal, which is subsequently put in the time pattern of the parallel transmitted clock signal, is reconstructed from the transmitted edge information.

In addition, the A.T.R. publication, Vol. 11, No. 2, 1977, pp. 14 to 27, has discussed a method of encoding a PCM signal for a line-bound transmission path, in which a PCM signal is applied to a coder that comprises a modulo-2 adder, a delay arrangement and an arithmetical adder. In that coder a data signal, which can be tapped from the output of the modulo-2 adder, is delayed in the delay arrangement and fed back to an input of the modulo-2 adder. In the arithmetical adder, the signal produced by the delay arrangement is added with sign inversion to the signal produced by the modulo-2 adder. The bipolar sequence obtained at the output of the arithmetical adder is applied to the line-bound transmission path. On the receiver side, clock information in the signal can be reconstructed by rectifying the received signal.

Furthermore, GB 2 061 674 A (corresponding to U.S. Pat. No. 4,367,495) discloses a method for magnetic recording and reproduction of a digital signal, in which an available binary digital signal is converted into an intermediate signal by means of a precoder. The precoder comprises a delay circuit for delaying the available digital signal by two clock periods, as well as a modulo-2 adder, in which the available digital signal and the delayed signal are added together. The intermediate signal, which can be tapped from the output of the modulo-2 period and substracted from the undelayed intermediate signal and recorded on a magnetic tape by a video recording device. During the playback operation, the signal taken from the magnetic tape is delayed for the duration of a clock period and added to the undelayed signal. The original digital signal is recovered from the thus produced signal by means of discrimination. The known method is disadvantageous in that the signal recorded on the magnetic tape is no longer compatible with the available digital signal. Therefore, with magnetic tape recorders which are designed for a standard differing from this recording format, it is impossible to play back a signal recorded according to this known method.

Finally, DE 33 46 745 A1 (corresponding to U.S. Pat. No. 4,528,601) discloses a method of magnetic recording and playback of signals according to the partial response method. According to this method a PCM signal is led through a converter (exclusive-OR processing) and a delay arrangement. The delayed output signal of the delay arrangement is led back to the converter, so that a modulo-2 addition can be performed in the converter. Immediately afterwards, a unipolar digital signal obtained in this manner is amplified by a recording amplifier and recorded on magnetic tape by a magnetic head. On the playback side, the recorded digital signal is taken off from the magnetic tape by means of a playback magnetic head, amplified and equalized. On the basis of the differentiating transmission ratio of the head-tape system, the equalized playback signal adopts three different values ("+1", "0", "−1"), which are converted back to the original PCM signal in an expensive threshold control circuit.

SUMMARY OF THE INVENTION

It is an object of the present invention to provide a magnetic tape recording device as mentioned in the opening paragraph, which largely eliminates the transmission inherent signal distortions by means of an inductively coupled transmission path.

The recording device in accordance with the invention is characterized in that a rectifier stage (21) is provided which is installed on the rotating drum and an input of which rectifier stage is coupled to the rotor winding for rectifying a ternary output signal obtained from the rotor winding.

The recording device according to the invention is advantageous, in that the frequency spectrum of the data signal to be transmitted can be adapted to the transmission ratio of a rotor-stator transmission path when a precoding is used, so that especially the DC voltage components contained in a data signal are not lost while, in addition, the coding and form of the data signal recorded on a magnetic tape remain unchanged and an existing recording standard is adhered to.

BRIEF DESCRIPTION OF THE DRAWINGS

An exemplary embodiment of the invention is represented in the drawings and further explained in the following description, in which:

FIG. 1 shows a circuit arrangement for recording a data signal on a magnetic tape according to the state of the art, FIGS. 2a-2d show voltage time diagrams in elucidation of the circuit arrangement shown in FIG. 1;

FIGS. 4a-4h show voltage time diagrams in elucidation of the circuit arrangement shown in FIG. 3.

DESCRIPTION OF THE PREFERRED EMBODIMENT

Figure 3:
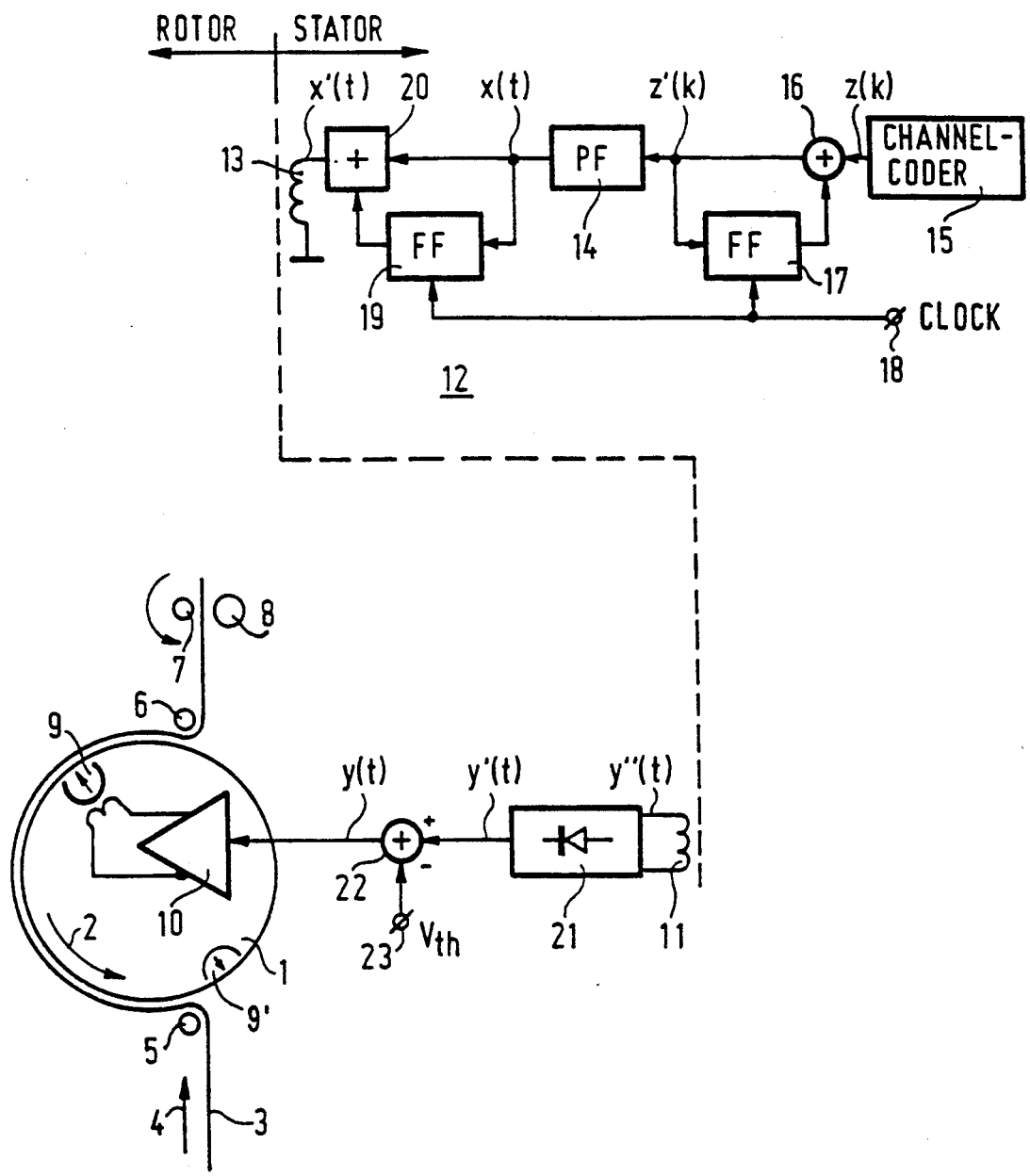
FIG. 3 shows a circuit arrangement according to the invention for recording a data signal on a magnetic tape.

In FIG. 1 a body of revolution rotating in the direction of an arrow 2 is denoted 1. The body of revolution 1 may be, for example, the rotary head wheel of a scanning system (not shown), around which a magnetic tape 3 is would helically. The magnetic tape 3 is advanced in a direction 4 and guided by two guide elements 5 and 6. The magnetic tape 3 is advanced by means of a drive shaft 7 connected to a rubber capstan idler 8. A plurality of magnetic heads, 9 and 9' are installed around the circumference of the body of revolution 1. The recording magnetic head 9 is driven by a recording amplifier 10 disposed on the rotating body of revolution 1. The input of the recording amplifier 10 is connected to a rotor winding 11 of a rotary transformer 12. The rotor winding 11, just like the recording amplifier 10, is disposed on the body of revolution 1. A data signal to be recorded on the magnetic tape 3 is transmitted from a stationary stator winding 13 of the rotary transformer 12 to the rotary rotor winding 11. Similarly, the recording magnetic head 9' is driven by a recording amplifier (not shown) which is connected to a rotor winding (not shown) of the rotary transformer 12. The data signal is tapped from the output of a pulse filter 14 which is driven by a channel coded data sequence produced in a channel coder 15.

For the explanation of the operation of this prior-art arrangement, it is assumed that at the output of the channel coder 15, a channel coded data sequence z(k) as shown in FIG. 2a is present which comprises a large DC voltage component. The pulse filter 14 converts this channel coded data sequence z(k) into a data signal x(t) (FIG. 2b). In the simplest case the pulse filter 14 may comprise a D-flip-flop which takes over the channel coded data sequence of FIG. 2a in dependence on an associated clock T. The zero line in this data signal x(t) is midway between two logic voltage levels ("0" and "1"). The rotary transformer 12 has the ideal frequency response curve H(f) shown in FIG. 2c. According to this curve, low-frequency signal portions can only be attenuated or even no longer be transmitted from a rather low limit frequency $f_o$. On the basis of this transmission behavior, the zero line of the data signal to be transmitted x(t) is shifted, so that the zero line curve shown in FIG. 2d of the data signal y(t) appears. Since the recording amplifier 10 installed on the body of revolution 1 linearly amplifies the applied data signal y(t), the negative signal components of the data signal y(t) are no longer sufficient for completely magnetizing the magnetic tape 3. The data signal is not recorded error-free.

FIG. 3 shows a circuit arrangement which does not have the disadvantages with respect to the non-error-free transmission of DC voltage components described with reference to FIGS. 1 and 2. In FIG. 3 the elements corresponding to like elements in FIG. 1 are denoted by like reference characters. In contradistinction to the circuit arrangement shown in FIG. 1, in FIG. 3 the channel coded data sequence z(k) produced by the channel coder 15 is not directly applied to the pulse filter 14 but through an exclusive-OR element 16. A signal z'(k) which can be tapped from the output of the exclusive-OR element 16 is delayed in a first delay stage 17 by a clock period T of a clock signal available at a terminal 18 and led back to another input of the exclusive-OR element 16. The exclusive-OR element 16 performs a modulo-2 addition of the channel coded data sequence z(k) and the channel coded data sequence delayed by a clock period. In elucidation of this relation, FIG. 4a once again shows the channel coded data sequence z(k) represented in connection with FIG. 2a. FIG. 4b shows the data sequence z'(k) derived by means of the modulo-2 addition. The data signal x(t) as shown in FIG. 4c whose zero line runs midway between the two logic voltage levels ("0" and "1") is the result of a pulse filtering in the pulse filter 14. Subsequently, the data signal x(t) is also delayed by a clock period T of the clock signal available at terminal 18 in a second delay stage 19 and added to the undelayed data signal x(t) in an adder stage 20, which leads to the variation of a signal x'(t) represented in FIG. 4d. The signal x'(t) is a ternary signal having the levels "+2", "0" and "−2". The level of the zero line corresponds to the "0" level of the ternary signal x'(t), in which a logic zero ("0") corresponds to the "0" voltage level and a logic one ("1") corresponds to the "−2" or "+2" voltage levels.

The data signal x'(t) processed in this manner is transmitted via the stator winding 13 of the rotary transformer 12 to the rotor winding 11 located on the side of the rotor and rectified there by means of a rectifier 21. At the input of the rectifier 21, the signal y"(t) is available having the three voltage levels "+2", "0" and "−2" which is substantially unaffected by the amplitude response curve H(f) (FIG. 4e) of the rotary transformer 12. The rectifying operation in the rectifier stage 21 raises the "−2" levels in the ternary signal to above the zero line, so that the result is the signal curve shown in FIG. 4g for a signal y'(t) at the output of the rectifier stage 21. Subsequently, in an adder stage 22 a voltage $V_{th}$ applied to a terminal 23 is added with sign inversion to the received signal y'(t). As a result of this DC voltage shift, the zero line is again shifted to the middle of the bipolar signal and thus a data signal y(t) (FIG. 4h) is produced which symmetrically drives the recording amplifier 10 both in the positive and in the negative direction. A circuit arrangement (not shown), substantially identical to the rotor winding 11, rectifier 21, adder 22 and recording amplifier 10, is connected to the recording magnetic head 9'.

The circuit portions arranged between stator winding 13 of the rotary transformer 12 and the pulse filter 14 form a prefilter for producing a pulse shape which does not comprise a DC voltage component. But since this pulse shape is affected by adjacent pulses, a precoder which cancels this intersymbol interference is inserted between the pulse filter 14 and the channel coder 15.

It should further be observed in this respect that the precoder constituted by the elements 16 and 17 is not essential and depends on the type of the recording method. Also a precoder with a 2-bit delay line could be used. Generally, the precoder may be considered part of the channel coder 15. For the various applications of a precoder reference be made to the publication entitled "A Study on Detection Methods of NRZ Recording" by S. Nakagawa et al; IEEE Trans. on Magn., MAG-16, No. 1, Jan. 1980, pp. 104 to 110, especially FIG. 8.

In addition, the described measures may also be implemented on the playback side. A coding arrangement such as the coding arrangement 19, 20 of FIG. 3 would then have to be disposed on the rotary head drum and a rectifier be connected to the stator side of the inductive transmitter.

I claim:

1. Magnetic tape recording device for recording digital data signals in tracks to be recorded obliquely relative to the longitudinal direction of the magnetic tape, comprising a rotary drum on which at least two recording heads are installed; and inductive transmission arrangement for transmitting to the magnetic heads the data signal to be recorded, said transmission arrangement including a stator winding and a rotor winding; an input terminal for receiving the data signal to be recorded; and a coding arrangement having an input coupled to the input terminal and an output coupled to the stator winding, said coding arrangement including a delay arrangement for delaying the data signal to be recorded for the duration of a bit period in the data signal, and a signal combining state, said signal combining state being arranged for combining the data signal delayed by a bit period and the undelayed data signal to obtain a ternary output signal, characterized in that said magnetic tape recording device further comprises a rectifier stage installed on the rotary drum, said rectifier stage having an input coupled to the rotor winding for rectifying a ternary output signal obtained from the rotor winding.

2. Magnetic tape recording device as claimed in claim 1, characterized in that the signal combining stage is arranged for adding or subtracting the data signal delayed by a bit period and the undelayed data signal.

3. Magnetic tape recording device as claimed in claim 1, characterized in that the magnetic tape recording device further comprises a precoder stage inserted before the coding arrangement, said precoder stage comprising a modulo-2 adder stage and a delay arrangement, said delay arrangement being arranged for delaying the data signal applied to an input for the duration of a bit period in the data signal, said precoder stage having an input coupled to a first input of the modulo-2 adder stage, an output of the modulo-2 adder stage being coupled to an output of the precoder stage and to an input of the delay arrangement, and an output of the delay arrangement being coupled to a second input of the modulo-2 adder stage.

4. Magnetic tape recording device as claimed in claim 1, characterized in that said magnetic tape recording device further comprises an adder stage arranged on the rotary drum for adding a DC voltage to the output signal of the rectifier stage.

5. Magnetic tape recording device as claimed in claim 2, characterized in that said magnetic tape recording device further comprises an adder stage arranged on the rotary drum for adding a DC voltage to the output signal of the rectifier stage.

6. Magnetic tape recording device as claimed in claim 3, characterized in that said magnetic tape recording device further comprises an adder stage arranged on the rotary drum for adding a DC voltage to the output signal of the rectifier stage.

7. Magnetic tape recording device as claimed in claim 2, characterized in that the magnetic tape recording device further comprises a precoder stage inserted before the coding arrangement, said precoder stage comprising a modulo-2 adder stage and a delay arrangement, said delay arrangement being arranged for delaying the data signal applied to an input for the duration of a bit period in the data signal, said precoder stage having an input coupled to a first input of the modulo-2 adder stage, an output of the modulo-2 adder stage being coupled to an output of the precoder stage and to an input of the delay arrangement, and an output of the delay arrangement being coupled to a second input of the modulo-2 adder stage.

8. Magnetic tape recording device as claimed in claim 7, characterized in that said magnetic tape recording device further comprises an adder stage arranged on the rotary drum for adding a DC voltage to the output signal of the rectifier stage.

* * * * *